April 14, 1936. G. RODDEWIG ET AL 2,037,436
AUTOMATIC PULLEY ARRANGEMENT
Filed May 27, 1935
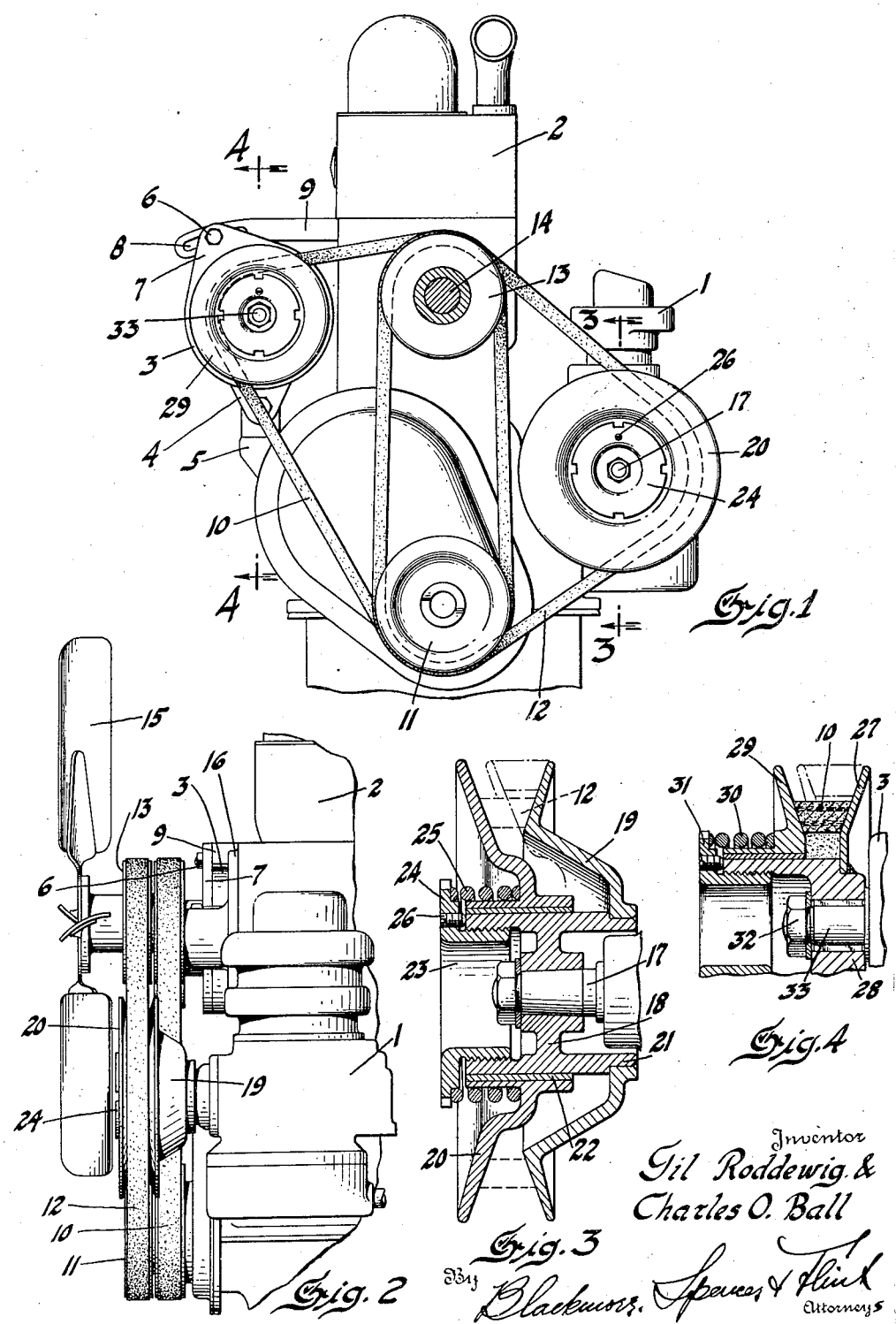
Inventor
Gil Roddewig &
Charles O. Ball Patented Apr. 14, 1936

2,037,436

UNITED STATES PATENT OFFICE 2,037,436

AUTOMATIC PULLEY ARRANGEMENT

Gil Roddewig, Pontiac, and Charles O. Ball, Birmingham, Mich., assignors to General Motors Truck Corporation, Pontiac, Mich., a corporation of Delaware Application May 27, 1935, Serial No. 23,648

8 Claims. (Cl. 74—242.9)

Engines for motor vehicles are usually provided with a belt drive at the front end of the crankshaft for operating through pulleys the various accessory devices, such as a radiator fan, a water pump, an electric generator, an air compressor and the like. In the case of large engines for heavy duty vehicles, especially buses and trucks, it has been proposed to use a double belt drive for the shaft of the water pump which circulates the heat exchanging medium through the engine cooling system. The double belt drive insures proper action of the pump, particularly when the radiator fan is mounted for convenience on the same shaft with the pump. When two additional accessory devices, for example, a generator and a compressor, are to be driven by the same belts and a single belt drive is sufficient for each, it is proposed to run one of the pair of belts on a pulley driving one accessory and to run the other belt on a pulley associated with the other accessory.

While an arrangement of this sort effects saving in costs and gives the desired operation when the belts are adjusted for the same tension, there are complications involved in initially setting and maintaining over a long period of operation an equal tension on both belts. The inequalities result in slippage and rapid wear of the belts and improper functioning of the driven devices.
To render practical the commercial use of the belt drive referred to by the provision of means automatically to maintain the same tension on the two belts, is the primary aim of the present invention.
A further object of the invention is to provide a power transmission drive wherein multiple belts transmit the drive from a power shaft to a driven shaft and one or more of such belts, each drive independently an additional shaft, and wherein at least one belt engages an expansible pulley whose driving surface is varied in diameter automatically in accordance with belt tension, to equalize the tension on the several belts and thereby cause each belt to do its full share of work.
Additional objects and advantages will become apparent during the course of the following specification taken in connection with the accompanying drawing, wherein Figure 1 is a front elevation of an engine with the belt drive; Figure 2 is a side elevation showing the relation of driving and driven parts, and Figures 3 and 4 are detail sectional views of the driven pulleys and are taken on lines 3—3 and 4—4, respectively, of Figure 1.
In the drawing the numeral 1 indicates an air compressor mounted at one side of the engine 2, and 3 is a generator mounted on the opposite side of the engine. These units may be mounted on the engine in any convenient fashion and by way of example the generator is shown as being provided with an attachment ear 4 by which it is pivotally secured to a bracket 5 and held in various positions of adjustment by a screw stud 6 threaded into an ear 7 on the generator and projected into an elongated slot 8 of the fixed bracket 9. The generator is driven by a belt 10 engaging the double pulley 11 on the front end of the engine crankshaft and which is also engaged by the belt 12 for driving the air compressor. Both belts also engage the double pulley 13 on the shaft 14 which carries a radiator fan 15 at one end and at its other end a water pump which is enclosed within a casing 16 mounted on the front face of the engine block 2.

The single belt pulley for the compressor is shown in the detail view, Figure 3, where the compressor shaft 17 has fastened thereon a hub 18 for the axially spaced and relatively movable sections 19 and 20 of the V-grooved pulley. The section 19 is fixedly mounted on the shouldered end 21 of the hub 18 while the portion 20 is mounted for axial movement through a bearing sleeve 22 on the periphery of the hub 18. Threaded interiorly of the hub is a hollow retaining sleeve 23 having an outwardly extending flange 24 providing a seat for one end of a coiled compression spring 25 which acts against the movable pulley section 20 to yieldingly resist the separation of the inclined driving surfaces. A threaded stud 26 extending through the flange 24 and bearing against the end of the hub 18 serves to lock the sleeve 23 against unthreading.

Substantially the same construction is used for the generator pulley, as shown in Figure 4 where one of the pulley sections 27 is welded to the hub 28 and the other section 29 is slidable on the hub against the spring 30 held by the hollow sleeve 31. The hollow sleeve permits access to the fastening nut 32 for applying or removing the assembly to the generator shaft 33. In this view the driving belt 10, which is of the well known V-type, is located well within the groove with the driving sections spread apart to practically their limit which affords a belt engaging surface of relatively small diameter. This belt engaging diameter is varied, depending upon the tautness of the belt in relation to the force exerted by the compression spring. By broken lines there is illustrated the belt in driving relation on a substantially larger diameter. In like manner Figure 3 shows the belt in various driving relations.

From the above description it will be apparent that the both belts 10 and 12 are in driving relation with the pulleys 11 and 13 and that the belt 10 additionally is in driving relation with the generator pulley while the belt 12 drives the compressor pulley. Since each belt engages with an expansible pulley it will be apparent that each expansible pulley takes up excess slack in the belt engaged thereby and that the drive is transmitted from the power shaft to the fan and pump shaft equally by the two belts, because of the equalized tension under which they operate.

We claim:

1. Engine accessory drive mechanism, including a double pulley adapted to be carried by an engine power shaft, a double pulley for a driven part, a pair of power transmission belts engaging said double pulleys, a pair of expansible single pulleys for parts to be driven, one engageable with one of said belts and the other engageable with the other belt, and automatically acting means associated with the expansible pulleys to correspondingly tension both belts.

2. The combination with a driving shaft and three shafts to be driven, of double belt pulleys on the driving shaft and on one of the driven shafts, and single belt expansible pulleys on each of the other two driven shafts, together with a pair of drive belts, both engaging the double belt pulleys and one thereof also engaging one of said single belt expansible pulleys and the other thereof also engaging the other of said single belt expansible pulleys.

3. Power transmission means, including a driving belt engaging a pair of pulleys, a second driving belt also engaging said pulleys and additionally independently engaging a third pulley and means automatically adjustable to maintain substantially equal tension on both belts.

4. In an internal combustion engine, a power shaft having a pair of belt pulleys, a water pump and fan shaft having a pair of pulleys, a pair of accessory devices, each having a single expansible pulley, and a pair of driving belts engaging in common driving relation, the pulleys on said shafts and separately an expansible pulley of an accessory device.

5. In combination, a plurality of power transmission belts, a source of power having a multiple belt pulley common to said belts, a driven device also having a multiple belt-pulley common to said belts, and auxiliary driven devices having expansible pulleys each driven individually by a different one of said belts.

6. In a multiple belt driving arrangement, a source of power, a plurality of driven devices, a group of driving belts, each engaging individually a driven device and in common with other belts a driven device and the source of power, multiple belt-pulleys associated with the source of power and the last mentioned driven device, and expansible belt engaging pulleys associated with each individually driven device.

7. In combination, a pair of pulleys each having double belt grooves, a pair of power transmission belts fitting the grooves, respectively, another pulley having a single belt groove to which one of said pair of said belts is fitted, and means acting automatically to equalize operating tension on the belts.

8. In a power transmission arrangement of the character described, a series of pulleys, a series of drive belts each engaging at least two of said pulleys in common with other belts, and at least one but not all of the belts engaging separately another of the pulleys, and means acting automatically to maintain all the belts under substantially equal tension.

GIL RODDEWIG.
CHARLES O. BALL.